US010795029B2

(12) United States Patent
Stastny et al.

(10) Patent No.: US 10,795,029 B2
(45) Date of Patent: Oct. 6, 2020

(54) SYSTEMS AND METHODS FOR TRANSMITTING SHIP POSITIONS AND TRACKS OVER MULTIPLE COMMUNICATIONS CHANNELS

(71) Applicants: John Stastny, San Diego, CA (US); Bryan D. Bagnall, San Francisco, CA (US); Sparta Cheung, San Diego, CA (US)

(72) Inventors: John Stastny, San Diego, CA (US); Bryan D. Bagnall, San Francisco, CA (US); Sparta Cheung, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 398 days.

(21) Appl. No.: 15/895,202

(22) Filed: Feb. 13, 2018

(65) Prior Publication Data

US 2018/0231669 A1 Aug. 16, 2018

Related U.S. Application Data

(60) Provisional application No. 62/458,825, filed on Feb. 14, 2017.

(51) Int. Cl.
*G01S 19/46* (2010.01)
*B63B 69/00* (2013.01)
*G01C 21/20* (2006.01)

(52) U.S. Cl.
CPC .............. *G01S 19/46* (2013.01); *B63B 69/00* (2013.01); *G01C 21/203* (2013.01); *B63B 2203/00* (2013.01); *G01C 21/20* (2013.01)

(58) Field of Classification Search
CPC ..... B63B 69/00; B63B 2203/00; G01C 21/20; G01C 21/203; G01S 19/46
See application file for complete search history.

(56) References Cited

U.S. PATENT DOCUMENTS 5,506,587 A 4/1996 Lans
7,805,146 B1 9/2010 Beyer, Jr.
(Continued)

OTHER PUBLICATIONS

Raymond, Eric S., AIVDM/AIVDO Protocol Decoding, Version 1.52, Aug. 2016, http://www.catb.org/gpsd/AIVDM.html.
(Continued)

*Primary Examiner* — Raymond S Dean
(74) *Attorney, Agent, or Firm* — Naval Information Warfare Center, Pacific; Kyle Eppele; Arthur K. Samora

(57) ABSTRACT

An Automatic Identification System (AIS) transponder and method for transmitting vessel AIS data can include an onboard processor and database, a VHF AIS transceiver and cellular modem connected to the processor, and a navigation sub-system for providing position inputs to the processor. The processor can include written instructions for transmitting only single sentence AIS messages when the transponder is within $R_{sAIS}$ of a satellite but outside range $R_{tAIS}$ of a terrestrial AIS base station, and switching to the base station when the vessel is within $R_{tAIS}$ but outside of cellular modem range, $R_{cell}$. While transmitting to the AIS satellite or AIS base station, portions of the vessel AIS are recorded to the database as historical data. Once within $R_{cell}$, the transponder can switch to transmission via cellular modem to an AIS architecture server. Historical data can also be downloaded to complete and update the vessel AIS data profile within AIS.

10 Claims, 4 Drawing Sheets

(56) References Cited

U.S. PATENT DOCUMENTS

| | | | |
|---|---|---|---|
| 10,200,113 B2* | 2/2019 | Delay | G08G 3/02 |
| 10,302,769 B2* | 5/2019 | Delay | H04B 7/1851 |
| 10,399,650 B2* | 9/2019 | Delay | G05D 1/0206 |
| 2015/0134559 A1* | 5/2015 | Murray | G06Q 10/0833 |
| | | | 705/333 |

OTHER PUBLICATIONS

Department of Homeland Security, Smart Chart AIS 2011 Solicitation Abstract, Solicitation Year 2011, Solicitation Topic Code H-SB011.1-001.

UNK, Report Your Own Position, www.marinetraffic.com/en/p/report-your-own-position (Feb. 12, 2018).

Benton, Charles J., AIS Class E—Supporting the Recreational Boating Community Over Wireless Internet, e-Navigation Underway Conference, California Maritime Academy, Apr. 4, 2014.

Wikipedia Automatic IdentificaitonSystems, https://en.wikipedia.org/wiki/Automatic_identificaiton_system (Feb. 12, 2018).

USCG, Class A AIS Position Report, www.navcen.uscg.gov (Feb. 12, 2018).

USCG, Class A AIS Static and Voyage Related Data Report, www.navcen.uscg.gov (Feb. 12, 2018).

Bagnall, Bryan et al., System and Method for Transmitting and Receiving Radar Data Using the Automatic Identification System, Unpublished Provisional U.S. Appl. No. 62/586,331, filed Nov. 15, 2017.

\* cited by examiner

SYSTEMS AND METHODS FOR TRANSMITTING SHIP POSITIONS AND TRACKS OVER MULTIPLE COMMUNICATIONS CHANNELS

CROSS REFERENCE TO RELATED APPLICATIONS

This application claims the benefit of U.S. Provisional Application 62/458,825, filed Feb. 14, 2017, by John Stastny, et al., entitled "Systems and Methods for Transmitting Ship Positions and Tracks over Multiple Communications Channels". The contents of the '825 application are hereby incorporated by reference into this specification.

FEDERALLY SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 103999.

FIELD OF THE INVENTION

The present invention pertains generally to tracking systems. More specifically, this invention pertains to maritime vessel tracking systems. The invention is particularly, but not exclusively, useful as a maritime tracking system that can incorporate and integrate multiple available communications channels, including cellular data channels and existing Automated Identification System (AIS) channels, to result in a more efficient, cost-effective vessel reporting system.

BACKGROUND OF THE INVENTION

The ability to track vessels using transponders is critical for a wide range of maritime applications, including maritime safety and security, counterpiracy, and fisheries monitoring, control and surveillance. Most existing transponders utilize the Automated Identification System (AIS) which can further use Self Organized Time Division Multiple Access (SOTDMA) communications on VHF maritime channels 161 and 162. These types of AIS transponders can have several limitations.

First, in order to receive the messages sent by these transponders, a terrestrial AIS receiver must be within VHF range, which is typically no more than 40 nm. The AIS receivers also require a source of power to operate. To send the AIS messages to a server to be combined with AIS from multiple receivers, the receiver also requires an internet connection. Oftentimes vessels are outside this 40 nm range, or there are no terrestrial AIS receivers present. These vessels require other methods to be tracked using AIS.

To track vessels that are out of range of the terrestrial AIS receivers, AIS receivers can also be mounted on satellites. The range from the vessel to the receiver is much greater in this case. However, messages can only be received when a transponder is within the footprint of the satellite, which orbits the earth. This can result in large temporal and spatial gaps in reporting coverage of maritime traffic. In addition, as a side-effect of SOTDMA, satellite based AIS receivers can be prone to channel saturation, which can result in message collisions that can ultimately result in many transmitted AIS messages not actually being received at the satellite AIS receiver. This collision of data can reduce the quantity and quality of vessel tracks.

Another type of transponder system can use Ultra High Frequency (UHF) satellite communications INMARSAT® system manufactured by International Mobile Satellite Organisation, London, UK, or the IRIDIUM® system, made by Iridium, Inc. of Washington D.C. Examples of this type of transponder can further include Vessel Monitoring System (VMS) and Long Range Identification and Tracking (LRIT). However, these transponders require a paid subscription to the satellite constellation owners, which can make them expensive to maintain/sustain, and expensive to use. As a result, they usually only transmit vessel positions every one to six hours, which can result in large gaps in vessel tracks.

Finally, cell phones can be used to provide tracking information using cellular data networks. Cellular data network tend to be much more robust and can have a much, much greater capacity to transfer data over an AIS network. However, transmission via a cellular network will only work when within range of a cellular tower near shore. Once outside this range, this method does not allow for transmission of ship track data.

In view of the above, it can be an object of the present invention to provide systems and methods for transmitting ship positions and tracks that can integrate multiple communications channels utilizing both cellular data networks and the existing AIS receiver communications channels (both land based and satellite) to significantly improve ship tracking performance while minimizing cost. Another object of the present invention can be to provide a system and method for transmitting ship positions and tracks over multiple channels that can transmit the complete historical trail of its own positions; it can also transmit the complete historical trail of the vessels within range of its AIS receiver, allowing for a more complete maritime domain picture. Still another object of the present invention can be to provide a system and method for transmitting ship positions and tracks over multiple channels that can use a cell phone architecture to become aware of the orbits of satellite AIS receivers and connected terrestrial receivers, and that can update this information whenever the transponder is within cellular data range according to a predetermined hierarchy. Another object of the present invention can be to provide a system and method for transmitting ship positions and tracks over multiple channels that can be easy to implement and use in a cost-effective manner.

SUMMARY OF THE INVENTION

A hybrid Automatic Identification System (AIS) transponder and method for transmitting vessel AIS data according to several embodiments of the present invention can include an onboard processor, very high frequency (VHF) AIS transceiver, a cellular modem connected to the processor, a database accessible from the processor and a navigation sub-system for providing vessel position inputs into the processor. The AIS vessel data can have static or dynamic segments, and the AIS vessel data can be transmitted to an AIS architecture that can include a plurality of terrestrial AIS (t-AIS) base stations, satellite AIS (s-AIS) stations, and at least one server for transmission of AIS data to the AIS architecture to and from the vessel (and other vessels).

The processor can include written instructions for accomplishing the methods of the present invention according to several embodiments. The methods can include the step of transmitting only single sentence AIS messages from the AIS transceiver to a satellite AIS (s-AIS) transceiver when the vessel is within a range envelope $R_{sAIS}$ of an s-AIS satellite, but outside of t-AIS base station range $R_{tAIS}$ and cellular modem range, $R_{cell}$. The methods can further include the step of switching transmission of the single sentence AIS message from said step A) from said s-AIS transceiver to a t-AIS base station, when within range $R_{tAIS}$ of at least one AIS base station. While within $R_{sAIS}$ or $R_{tAIS}$, but outside of $R_{cell}$, the processor can record the un-transmitted dynamic segments of the vessel AIS data to the vessel database as vessel dynamic historical data.

In some embodiments, the vessel dynamic historical data that is two or more sentences can be marked but not transmitted when vessel is within $R_{sAIS}$ and transmitting to an AIS satellite. Similarly, vessel dynamic historical data that is dynamic data can be marked and not transmitted when outside of $R_{cell}$. Once the vessel is within $R_{cell}$, the stored and marked static segments, and the stored and marked multi-sentence segments, which have been stored as vessel dynamic historical data, can be transmitted to the AIS architecture, but via the cellular modem and the server. Similarly, marked, multi-sentence vessel historical data can also be downloaded to the server via the cellular modem and cell tower, for further transmission over the AIS architecture. In this manner, the AIS architecture can enjoy increased data traffic flow and a greater capacity to handle vessel AIS data, particularly in congested areas, while AIS vessels can continue to report AIS data to the AIS architecture and/or archives as required.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
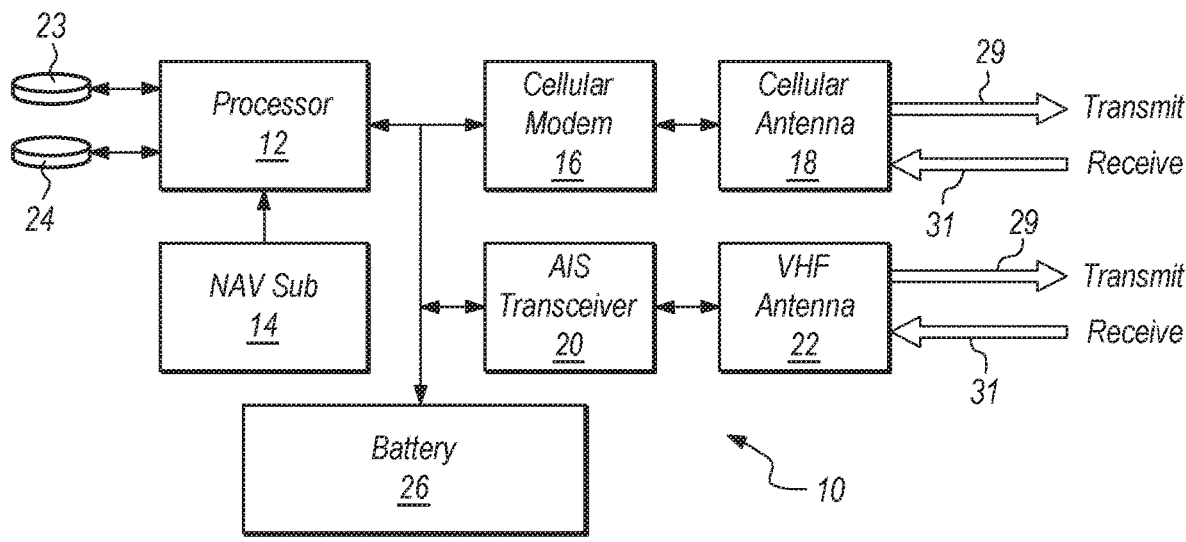
FIG. 1 is a high level block diagram of the ship position communications system of the present invention according to several embodiments.

Referring initially to FIG. 1, a high level block diagram of the system 10 of the present invention according to several embodiments can be shown. As shown, the system 10 can include a processor 12 having an internal memory. A navigation sub-system 14 can be connected to processor 12. Navigation sub-system 14 can provide a vessel position input to processor 12; such inputs can include a Global Position System (GPS) latitude and longitude, a dead reckoning tracer (DRT) input, a radar input, or really any other input as known in the art for locating and determining a vessel position.

A cellular modem 16 and cellular antenna 18 can further be connected to processor 12, as shown in FIG. 1. A circuit board implementing the AIS communications protocol described herein, AIS transceiver 20, can be connected to processor 12 (in vessels where the system 10 according to several embodiments is being retrofit onto the vessel), or the written instructions for the AIS protocol and for the accomplishment of the methods of the present invention can be directly input as written instructions to processor 12. AIS transceiver 20 can continuously generate vessel Automatic Identification System (AIS) historical data for storage in vessel AIS database 24. An antenna 22 can be connected to AIS transceiver 20. Antenna 22 can include a VHF antenna when the system 10 is being implemented in a VHF-based reporting system such as AIS. In still other embodiments, antenna 22 can include a UHF antenna, when system 10 is being implemented in the UHF-based vessel reporting domain. Examples of such UHF-base systems can include INMARSAT® system manufactured by International Mobile Satellite Organisation, London, UK, or IRIDIUM® system, made by Iridium, Inc. of Washington D.C. A battery 26 can power the other components in FIG. 1. The system battery can be continuously recharged through a solar panel or by connecting a system to DC 12V power source (the vessel battery) directly.

Figure 2:
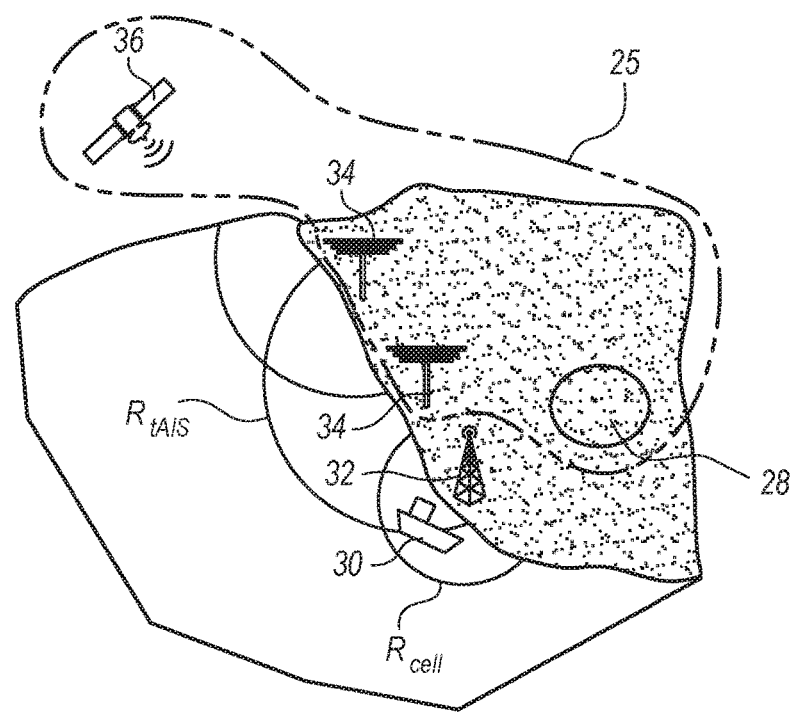
FIG. 2 is a diagram describing a scenario where a vessel and its onboard system of FIG. 1 are within transmission range $R_{cell}$ of a cellular phone tower and within range $R_{tAIS}$ of an Automatic Identification System (AIS) base station.

Referring now to FIGS. 1 and 2, the internal memory of processor 12 for system 10 can access location data pertaining to the position of all terrestrial AIS (t-AIS) base stations 34, as well as availability data pertaining to trajectories and projected reception envelopes for all satellite AIS (s-AIS) satellites 36 from an AIS architecture 25 (best shown in FIG. 2). The AIS data can be stored in an AIS database 23 for such access by processor 12. As mentioned above and shown in FIG. 1, system 10 can also include a vessel AIS data database 24, which can be connected to and selectively accessed by processor 12 as described above (in some embodiments, first vessel AIS database 24 and second AIS data database 23 can be the same database).

When within range of certain portions or all portions of AIS architecture 25, the system 10 can selectively communicate with a server 28 via modem 16 and cellular antenna 18 to transmit both real-time vessel AIS data as well as marked historical vessel AIS data which has been retrieved from vessel historical database 24 (arrow 29 in FIG. 1). Cellular modem and cellular antenna can further receive data pertaining to the orbits of s-AIS satellites 36 and positions of t-AIS base stations 34 (arrow 31 in FIG. 1). The selective communication of cellular modem 16, cellular antenna 18, AIS transceiver 20 and VHS (UHF) antenna 22 can be chosen, using a set of non-transitory instructions which is located on the internal memory of processor 12 (or in transceiver 20). The instructions can perhaps be described using the following scenarios and methodologies to determine the functionality of the reporting system 10 according to a predetermined toggling hierarchy.

Referring again to FIG. 2, one such scenario is shown. In FIG. 2, vessel 30 (and onboard system 10) is within cellular network range $R_{cell}$ of cellular tower 32. While this condition is true, the following steps can be accomplished by system 10. First, immediately upon entering cellular network range, and then once every 24 hours, the system 10 can update its on-board knowledge (AIS database 23) of all currently operational terrestrial AIS base stations 34 and envelope availability of s-AIS satellites 36 by accessing AIS architecture 25, using server 28 and via cellular tower 32, cellular antenna 18 and modem 16. This can take advantage of the greater, more robust data transfer capabilities of the cell phone ecosystem. Cellular tower 32 can further transmit the AIS data to a server 28 for further broadcast and transmission over AIS architecture 25. System 10 can also transmit the full historical set of vessel historical data which has been saved since the last time it was transmitted. This can fill any gaps in time from when the AIS transponder 20 was in VHF only range, $R_{tAIS}$, or when vessel 30 and system 10 were out of $R_{sAIS}$ and $R_{tAIS}$, or even when system 10 was within $R_{sAIS}$ but only transmitting one sentence messages (message formats are described below). While within cellular range $R_{cell}$, the system 10 can continue to transmit the position, heading, and speed of vessel 30 over cellular network every 30 seconds, or as required by international and local maritime/AIS regulations. Optionally, or as required by regulations, system 10 can continue to transmit the position, heading, and speed of vessel 30 over VHF AIS channels.

Figure 3:
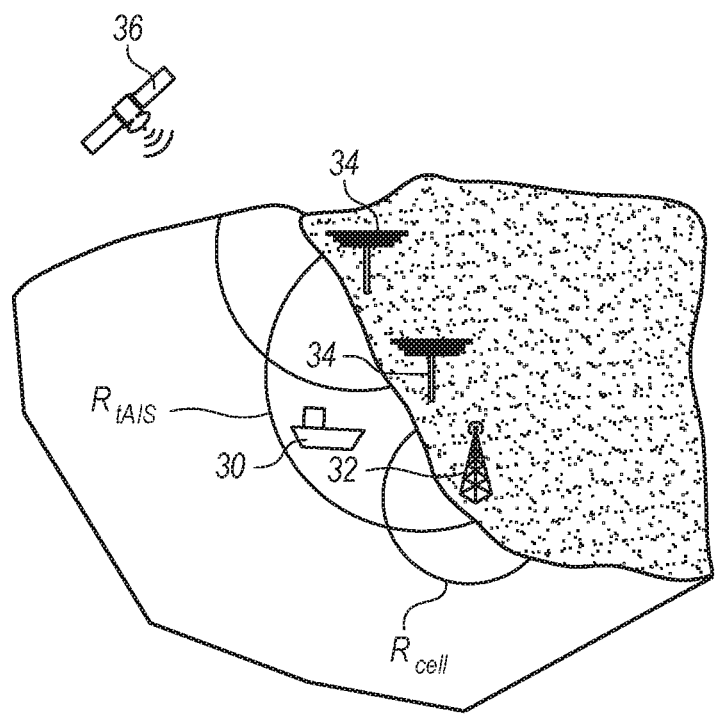
FIG. 3 is a diagram describing a scenario where a vessel and its onboard system of FIG. 1 are outside of $R_{cell}$ but still within $R_{tAIS}$.

Referring now to FIG. 3, a second scenario can be depicted. As shown in FIG. 2, vessel 30 (and thus system 10) can be outside of cellular range $R_{cell}$ of a cell tower 32, but can be within range $R_{tAIS}$ of at least one of a plurality of t-AIS base stations 34. System 10 can make this determination based the signal strength of the received cell signal, simply by defining a predetermined $R_{cell}$, or simply by making the determination based on a loss of cell phone signal. In this scenario, the system can accomplish the following steps. First, AIS transceiver 20 and VHF antenna 22 of system 10 can transmit both the dynamic AIS segments and static AIS segments. Navigation subsystem 14 can determine own position of vessel 30, as well as heading, and speed every 30 seconds as dynamic AIS vessel data and provide that input into processor 12. Processor 12 can cause system 10 to store the dynamic AIS vessel data in database 24 as vessel dynamic historical data, but not to transmit this AIS vessel dynamic historical data until vessel 30 is within cellular data range, $R_{cell}$.

With respect to the static and dynamic AIS data, and for purposes of this disclosure, AIS data segments ("messages" and "segments" can be taken to mean the same thing in this Written Description) can be broken down into two types of data segments, static data segments and dynamic data segments. Static data segments can be thought of as vessel data that does not change. Vessel name, Maritime Mobile Service Identity (MMSI) number, Ship Type, call sign and vessel dimensions can all be examples of vessel static AIS data. Dynamic data segments can be thought of vessel data that changes throughout a voyage, such as course, speed, Estimated Time of Arrival (ETA), etc. Static data segments and dynamics data segments can be transmitted as AIS messages. There are currently twenty-seven (27) different categories (Types) of standard AIS messages. One example of static data message can be a Type 24 Static Data Report as called out in "AIVDM/AIVDO protocol decoding" by Eric S. Raymond, ver. 1.52, dated August 2016. The Raymond AIVDM/AIVDO protocol decoding guide is hereby incorporated by reference herein. Once example of dynamic data can be a Type 18 Standard Class B Vessel Position Report, as called out in the Raymond AIVDM/AIVDO protocol decoding reference.

It should be appreciated however, that the static AIS data segment and dynamics AIS data segments that can be selected for marking and/or transmittal, or deferred transmittal can be varied by the operator, according to amount of vessel traffic in given geographic areas, as well as the amount and data processing capability of the AIS base stations 34 in the geographic area to process the reporting data from the vessel traffic. Additionally, AIS base stations 34 have their own specific AIS data messages to transmit. Still further, any available AIS satellites 36 from architecture 25 can also have AIS data to transmit and receive, and can do so on a Self-Organized, Time Domain Multiple Access (TDMA) basis). The incorporation of an additional cellular channel, and smart switching/toggling hierarchy for the systems and methods of the present invention can maximize the capabilities of the AIS architecture system to handle any "data traffic jams" that may occur and maximized the data transfer capability of the AIS architecture.

In order to more fully understand the systems and methods of the present invention, it may be helpful to review the standard format of an AIS message. The format of a typical data packet for a single sentence AIS message can be seen in AIS message (1) below, with the fields separated by commas:

(1)   !AIVDOM,1,1B,177KQJ5000G?tO`K>RA1wUb N0TKH,0*5C

Field 1, !AIVDO, identifies the above AIS data as an own-ship AIS message from vessel 30 (!AIVDM is an AIS message from another vessel)

Field 2 (1 in this example) is the count of fragments in the currently accumulating message. The payload size of each sentence is limited by the National Marine Electronics Association (NMEA) 0183's 82-character maximum, so it is sometimes required to split a payload over several fragment sentences.

Field 3 (1 in this example) is the fragment number of this sentence. A single sentence AIS message has a count of 1 in Field 2, will also have a count of 1 in Field 3, and is complete in and of itself.

Field 4 (empty in this example) is a sequential message ID for multi-sentence messages.

Field 5 (B in this example) is a radio channel code. AIS use the high side of the duplex from two VHF radio channels: AIS Channel A is 161.975 MHz (87B); AIS Channel B is 162.025 MHz (88B).

Field 6 (177KQJ5000G?tO`K>RA1wUbN0TKH in this example) is the data payload.

Field 7 (0) is the number of fill bits required to pad the data payload to a 6 bit boundary, ranging from 0 to 5. The *-separated suffix (*5C) is the NMEA 0183 data-integrity checksum for the sentence, preceded by "*".

A two-sentence AIS data packet can be shown as follows, please note Fields 2 and 3 (For purposes of this disclosure, a multi-sentence AIS data are a data packet where Field 2 does not have the value "1"). The following AIS message (2) has two sentences, due primarily to the length of the payload packet.

(2)   !AIVDM,2,1,3,B,55P5TL01VIaAL@7WKO@mBp 1U@<PDhh000000001S,AJ::4A 80?4i@E53,0*3E !AIVDM,2,2,3,B,1@0000000000000,2*55

Depending on where vessel 30 can be physically located and what scenario the ship can be in, the systems and methods of the present invention can make the determination on whether (or not) to send both dynamic AIS messages and static vessel AIS messages, and whether (and when) to limit such transmissions to single sentence AIS data segments.

Referring now to the payload field of the segments in messages (1) and (2) above, for example, the first six bits of the payload field can refer to the AIS type of message. The 27 categories (Types) of AIS messages are listed below in Table 1. More information on each type of message can be found in the Raymond reference.

TABLE 1

| | | |
|---|---|---|
| 01 Position Report Class A | 02 Position Report Class A (Assigned Schedule) | 03 Position Report Class A (Response to interrogation) |
| 04 Base Station Report | 05 Static and Voyage Related Data | 06 Binary Addressed Message |
| 07 Binary Acknowledge | 08 Binary Broadcast Message | 09 Standard SAR Aircraft Position Report |
| 10 UTC and Date Inquiry | 11 UTC and Date Response | 12 Addressed Safety Related Message |
| 13 Safety Related Acknowledgement | 14 Safety Related Broadcast Message | 15 Interrogation |
| 16 Assignment Mode Command | 17 DGNSS Binary Broadcast Message | 18 Standard Class B CS Position Report |
| 19 Extended Class B Equipment Position Report | 20 Data Link Management | 21 Aid-to-Navigation Report |
| 22 Channel Management | 23 Group Assignment Command | 24 Static Data Report |
| 25 Single Slot Binary Message, | 26 Multiple Slot Binary Message With Communications State | 27 Position Report For Long-Range Applications |

Each of the above Types can be defined as a static AIS message, a dynamic AIS message, or a hybrid AIS message (an AIS message that contains both static and dynamic messages). Thus, by looking at the first six bits of the payload field, the systems and methods of the present invention can determine whether the AIS message that is being generated by AIS transceiver 20 or received from another AIS-equipped vessel is a static AIS data segment or a dynamic AIS data segment, and react accordingly, as described herein. From Field 2, it can also be determined with the AIS segment is a single-sentence or a multi-sentence AIS message.

Figure 4:
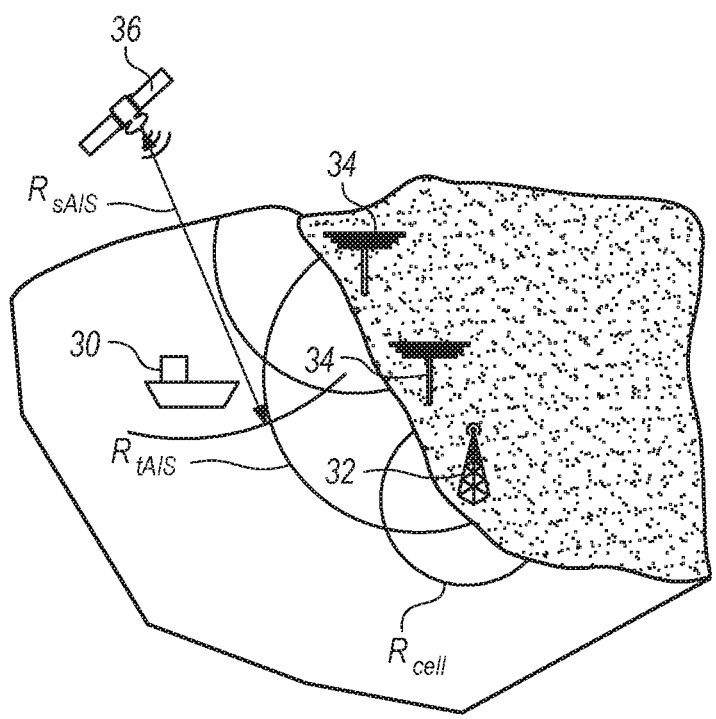
FIG. 4 is a diagram describing a scenario where a vessel and its onboard system of FIG. 1 is outside of both $R_{cell}$, and $R_{tAIS}$, but within range $R_{sAIS}$ of a reception envelope of an AIS satellite.

With the above in mind, and referring now to FIG. 4, a third scenario envisioned by the systems and methods of the present invention can be shown. In this scenario, system 10 can be aware that it is outside of terrestrial AIS receiver range $R_{tAIS}$ of terrestrial AIS base station 34, and outside cellular network range $R_{cell}$ of cellular towers 32, but that a satellite based AIS receiver 36 is approaching and that vessel 30 is or will shortly be within the reception envelope range $R_{sAIS}$ of AIS satellite 30. This awareness can be based on an input provided by AIS database 23 to processor 12 of satellite AIS receiver 36 envelope availability and terrestrial base station 34 data that was previously downloaded from AIS architecture 25 to AIS data database 23 the last time vessel 30 and system 10 were within $R_{cell}$. In this scenario, the instructions for processor 12 of system 10 can cause system 10 to accomplish the following steps.

First, the system 10 can transmit only single sentence AIS messages. This can increase the probability the message will be received, since two sentence AIS messages can have a relatively low chance of being received by satellite receivers 36, when compared to single sentence AIS messages, due to the SOTDMA mode of operation of AIS satellites 36. The non-transmitted portion of the AIS message can be retained in vessel AIS data database 24 as vessel dynamic historical data. Additionally, the system 10 can continue to log position, heading, and speed every 30 seconds as vessel dynamic historical data, but system 10 does not transmit this AIS data as a dynamic AIS segment until vessel 30 is within cellular data range $R_{cell}$. Instead, the vessel dynamic historical data can be retained in database 24 until processor 12 can cause system 10 to transmit such vessel historical data from vessel AIS database 24 via cellular modem 16 and cellular antenna 18 to server 28 of AIS architecture 25 (when within $R_{cell}$).

System 10 can provide several advantages. More specifically, system 10 can utilize multiple communications channels to improve the ability to track vessels, resulting in more track positions provided with lower time delays. Additionally, system 10 does not require an AIS receiver (vessel 30) to be within base station $R_{tAIS}$ range to provide vessel positions. In many cases, small boats are beyond terrestrial AIS receiver ranges $R_{tAIS}$, but within cellular data range $R_{cell}$. System 10 can continue to report to AIS in these situations via cell tower 32 and server 28 of architecture 25, using the systems and methods of the present invention.

System 10 can provide further advantages, in that it can use knowledge of s-AIS satellites 36 and t-AIS base stations 34 and the cellular telecommunications system to reduce power consumption and increase the number of successfully transmitted vessel positions, resulting in improved maritime domain awareness. Still further, there are other devices that have the ability to transmit AIS data over the cellular network. Doing this frees up bandwidth for other AIS transponders (both terrestrial and satellite) operating on the busy AIS channels. Those systems don't have the ability to transmit/receive AIS messages when they are away from the cellular data network. This system 10 according to several embodiments is able to send over AIS VHF channels when cellular data is not available.

The ability to transmit data (either individual messages or in bulk) using Ultra High Frequency (UHF) communications channels could be added to the system to give it the ability to communicate with satellite communication networks such as the aforementioned INMARSAT® system manufactured by International Mobile Satellite Organisation, London, UK, or the IRIDIUM® system, made by Iridium, Inc. of Washington D.C., or other terrestrial receivers operating at UHF frequencies. To do this, system 10 can be combined with the radar over AIS system, as described in provisional U.S. Patent Application No. 62/586,331 by Bryan Bagnall et al. filed Nov. 15, 2017, and entitled "System and Method for Transmitting and Receiving Radar Data Using the Automatic Identification System". The contents of the '331 application are hereby incorporated herein by reference. This could allow radar data to be transmitted more frequently and efficiently over multiple channels (VHF/AIS and cellular data). An encryption protocol can be added, so that messages could be encrypted for additional level of security. Information from VHF/UHF signals received other than AIS could be collected and transmitted over the cellular data connection such as automatic dependent surveillance broadcast (ADS-B) signals, voice communications, radio beacons, etc.

Figure 5:
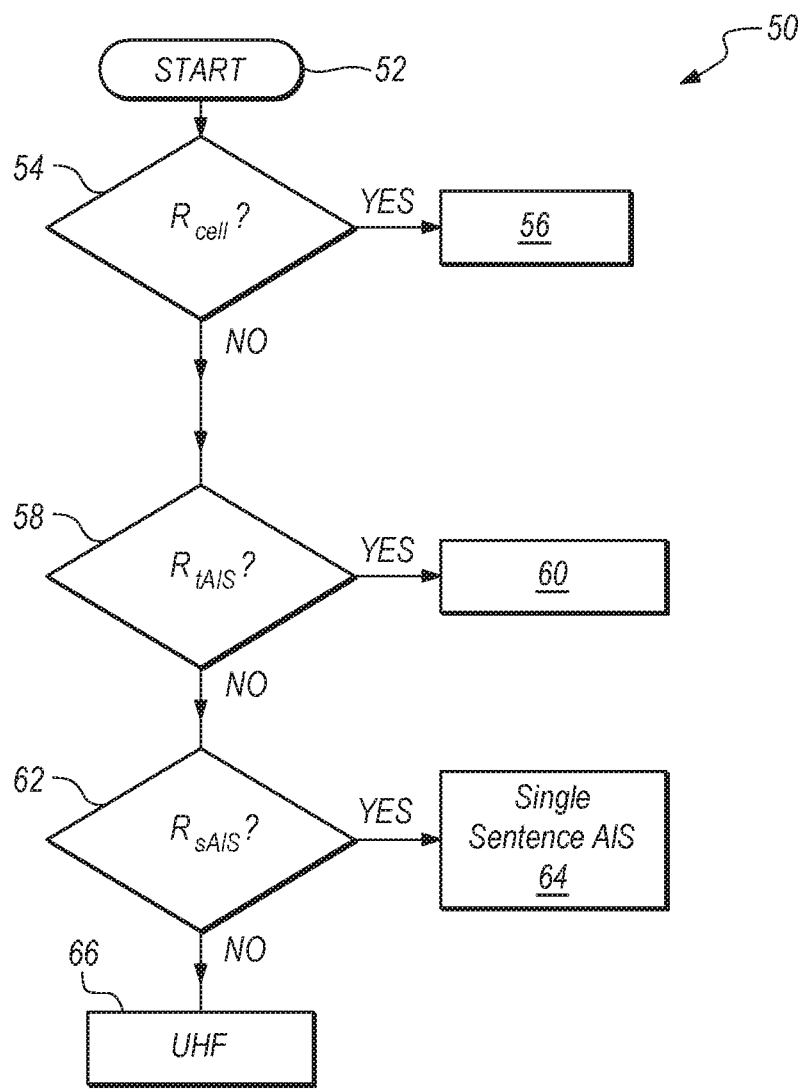
FIG. 5 is a logic diagram that can be used to illustrate the switching hierarchy of the system of FIG. 1; and, FIG. 6 is a block diagram, which can be illustrative of steps that can be taken to accomplish the methods of the present invention according to several embodiments.

Referring now to FIG. 5, a block diagram 50 is shown, which can be used to illustrate steps that can be taken accomplish the switching logic in order to the practice the methods of the present invention according to several embodiments. As shown by method 50 at start 52 the system 10 can determine whether it is in cellular range $R_{cell}$ of a cell tower 32, as shown by block 54. When within $R_{cell}$, the system 10 can take the following steps (depicted by block 56): 1) Update its on-board knowledge at processor 12 of data pertaining to all t-AIS base stations 34 and s-AIS satellites 36; 2) Transmit all vessel historical data from database 24 which has been saved since the last time it was transmitted; and, 3) Transmit the position, heading, and speed of vessel 30 (via cellular network) every 30 seconds. The actions represented by block 56 can be taken through server 28, cellular antenna 18 and modem 16, to take advantage of the greater data transfer rates and capabilities of the cellular tower 32. Optionally, if system 10 is within $R_{cell}$, it is most likely (but not always) also within terrestrial AIS transponder range $R_{tAIS}$, system 10 can also simultaneously transmit dynamic AIS messages such as Type 3 position, heading, and speed report for vessel 30 via AIS transceiver 20 and VHF antenna 22 every 30 seconds, or as required by international/territorial waters regulations.

Referring again to FIG. 5, if the vessel 30 (and onboard system 10) is not within $R_{cell}$, the system 10 can determine whether vessel 30 can be outside of $R_{cell}$, but within terrestrial AIS transceiver range $R_{tAIS}$, as shown by block 58. In such cases, system 10 can (block 60): 1) Incorporate AIS chip 20 and VHF antenna 22 to transmit both the dynamic and static standard AIS messages; and, 2) Navigation subsystem 14 can generate own-ship navigation data such as position, heading, and speed every 30 seconds but does not transmit this log until within cellular data range. Instead processor 12 can store such data with vessel AIS data database 24 as vessel dynamic historical data.

Referring now to block 62 of FIG. 5, if the vessel is outside of both $R_{cell}$ and $R_{tAIS}$, but system 10 is within $R_{sAIS}$ of s-AIS satellite 36, based on data form AIS data that can be retrieved from database 23 by processor 12, the instructions for system 10 can toggle the transmission mode to accomplish the following: 1) System 10 can transmit only single sentence AIS messages with outside of $R_{cell}$ and $R_{tAIS}$ but within $R_{sAIS}$, to increase the probability the message will be received; 2) Multi-sentence AIS messages can be retained in database 24 as vessel dynamic historical data; and, 3) System 10 can continue to log position, heading, and speed every 30 seconds but not transmit this vessel dynamic historical data until within cellular range $R_{cell}$, the situation depicted by block 54 described above.

Figure 6:
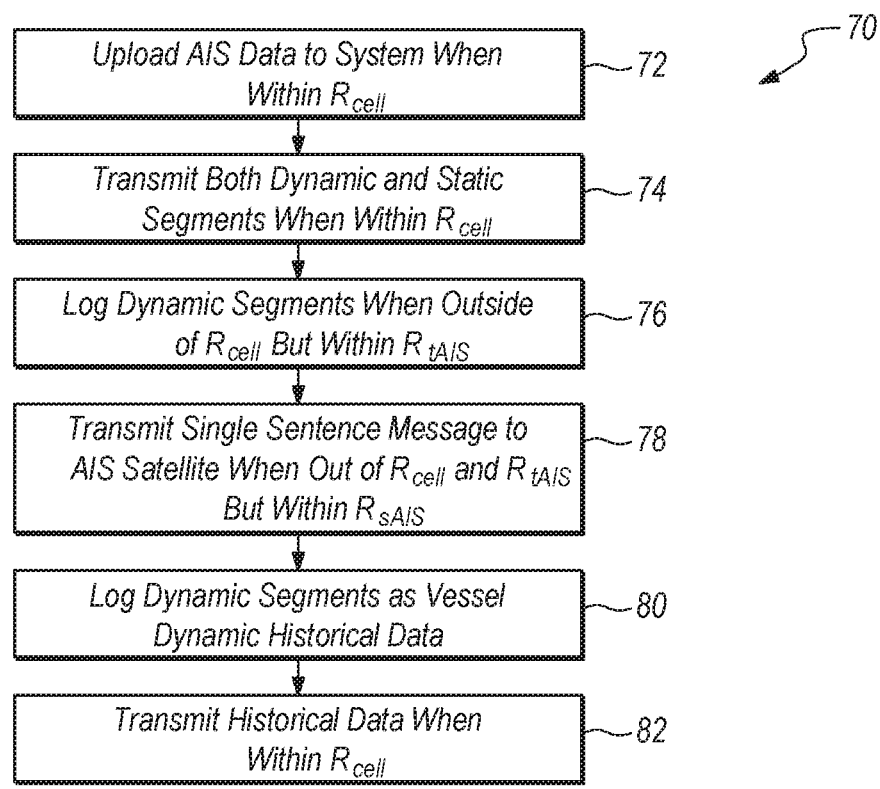

Referring now to FIG. 6, a block diagram 70 can be seen and can be used to illustrate the steps of the methods of the present invention according to several embodiments. As shown, method 70 can include the initial step 72 of uploading AIS data when system 10 is within $R_{cell}$ of AIS architecture 25. The AIS data can be stored in AIS database 23, as described above. The methods can further include the step 74 of transmitting both dynamic AIS segments and static AIS segments when vessel 30 is within $R_{cell}$. Method 70 can further include the step 76 of logging dynamic AIS segments, and storing that data as vessel dynamic historical data in database 24. Step 76 can be accomplished when system 10 can be outside of $R_{cell}$ but within reception range $R_{tAIS}$ of an AIS base station 34.

Method 70 can further the step 78 of transmitting single sentence AIS messages to s-AIS satellite 36 when vessel 30 is in satellite range $R_{sAIS}$, but outside or $R_{tAIS}$ and $R_{cell}$. In the meantime, processor 12 can cause system 10 to take the step of logging multi-sentence AIS segments as vessel dynamic historical data in database 24, as shown in step 80 in FIG. 7. Still further, once vessel 30 and system 10 are back within $R_{cell}$, the methods can further include the step 82 of toggling back to cellular transmission mode, by transmitting the vessel historical data via cellular modem 16, and cellular 18 to server 28 of AIS architecture 25. In this manner, the systems and methods of several embodiments can take advantage of the more robust data transfer capabilities of the cellular network to update the historical data profile of vessel 30.

In other alternative embodiments, processor 12 can record all! AIVDO messages in database 24 as both static and dynamic historical AIS data. When outside of $R_{cell}$, processor 12 can cause system 10 to mark, but not transmit. own-vessel !AIVDO dynamic data segments. The processor 12 is able to determine which AIS vessel historical data to mark by looking at the first six bits of the payload field of a given AIS segment to determine whether the AIS message is a static AIS segment or a dynamic AIS segment, as described above. If processor 12 for system 10 has determined that it is outside of $R_{cell}$ based on data accessed from AIS database 23 (or loss of signal strength/signal), system 10 can stop transmitting vessel dynamic data, can mark the vessel dynamic AIS data and can store the marked vessel dynamic historical data in database 24 for further eventual transmission to server 28 once vessel 30 and system 10 are back within $R_{cell}$. Once vessel 30 is back within $R_{cell}$, the dynamic vessel historical data can be transmitted by the modem 16, cellular antenna 18 and server 28 to "backfill" the AIS data profile for vessel.

In similar fashion, the processor 12, using the data from AIS database 23, can determine when it will be within $R_{sAIS}$ Once within $R_{sAIS}$, processor 12 can cause system 10 to stop transmitting multiple sentence AIS messages, or messages that do not have the value "1" in field 3. Instead, these messages can also be marked and stored in vessel historical AIS database 24. Once within $R_{cell}$, the marked multi-sentence AIS messages can be transmitted to AIS architecture 25 via cellular modem and sever 28, to further update the AIS data profile for the vessel.

It should be understood that the description above are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software in addition to, or instead of, computer readable instructions.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for decreasing vessel AIS data transfer traffic between Automatic Identification System (AIS) architecture and vessels;
    said vessel data corresponding to a vessel having a requirement to transmit said vessel data to said AIS architecture;
    said vessel AIS data having static segments and dynamic segments;
    said vessel having a processor with a first database, memory, a cellular modem and an AIS transceiver;
    said AIS architecture having a plurality of operational terrestrial AIS (t-AIS) base stations, a plurality of satellite AIS (s-AIS) satellites and at least one server, method comprising the steps of:
    A) transmitting only single sentence AIS messages from said vessel to a satellite AIS (s-AIS) satellite when said vessel is within range envelope $R_{sAIS}$ of said s-AIS satellite, but out of range $R_{cell}$ of said server, and range $R_{tAIS}$ of said t-AIS base stations;
    B) logging multi-sentence said AIS data as dynamic historical data to a first database at predetermined intervals awhile said step A) is accomplished, but not transmitting said dynamic historical data to said s-AIS satellite;
    C) switching transmission of said AIS data from said step A) from said s-AIS satellite to one of said t-AIS base stations when said vessel is within range $R_{tAIS}$, while continuing to accomplish said step B);
    D) toggling transmission from said step C) from said t-AIS base station to said server via said cellular modem and said cell tower, when said vessel is within range $R_{cell}$; and,
    E) downloading said dynamic historical data from said first database to said AIS architecture via said cellular modem and said cell tower;
    wherein location data pertaining to all currently operational said t-AIS base stations and said s-AIS satellites envelope locations has been previously stored in a second database on said vessel for access by said processor in performing said method.

2. The method of claim 1 further comprising the step of:
    F) updating said terrestrial AIS (t-AIS) location data and said (s-AIS) envelope location and availability data when within said $R_{cell}$.

3. The method of claim 1 wherein said predetermined interval from said step B) is thirty seconds.

4. The method of claim 1 where said dynamic data segment further comprises position (latitude and longitude), heading and speed of said vessel.

5. The method of claim 1, wherein said static data segment further comprises vessel Maritime Mobile Service Identity (MMSI) number, vessel name, vessel type and vessel dimensions.

6. The method of claim 1, wherein said step D) is accomplished based on a signal strength of said cellular modem.

7. The method of claim 1, wherein said step C) is accomplished when said $R_{tAIS}$ is about forty nautical miles (40 nm).

8. The method of claim 1, further comprising the step of:
    G1) subscribing to a ultrahigh frequency (UHF) AIS service;
    G2) transmitting single sentence AIS messages to said UHF AIS service when said vessel is outside of said $R_{cell}$, said $R_{tAIS}$ and said $R_{sAIS}$; and,
    G3) logging said vessel dynamic segments as historical data to said second database at predetermined intervals when said transmitting step is accomplished, but not transmitting said vessel position, heading and speed.

9. An Automatic Identification System (AIS) transponder for transmitting vessel AIS data to AIS architecture, comprising:
    a processor;
    a vessel navigation sub-system for providing navigation inputs for said vessel into said processor;
    a very high frequency (VHF) AIS transceiver connected to said processor for receiving commands from said processor;
    a cellular modem connected to said processor for receiving commands from said processor; and,
    said modem transmitting said AIS vessel data to an AIS architecture having a plurality of operational terrestrial AIS (t-AIS) base stations and plurality of satellite AIS (s-AIS) satellites and at least one server, said vessel AIS data having static segments and dynamic segments, and said processor having non-transitory written instructions to accomplish transfer of the AIS data according to a predetermined switching hierarchy;
    wherein said processor is configured, according to said switching hierarchy, to transmit only single sentence AIS messages from said AIS transceiver to a satellite AIS (s-AIS) transceiver when said vessel is within a range envelope $R_{sAIS}$ of said s-AIS transceiver;
    wherein said processor is configured, according to said switching hierarchy, to switch transmission of said single sentence AIS message from said s-AIS transceiver to a terrestrial AIS (t-AIS) base station of said AIS architecture vis said AIS transceiver, when said vessel is within range $R_{tAIS}$ of said t-AIS transceiver;
    said processor causing said dynamic segments of said vessel data as dynamic historical data to said database at predetermined intervals; and,
    wherein the processor is configured, according to said switching hierarchy, to toggle transmission from said t-AIS transceiver to said cellular modem, for further transfer to a server of said AIS architecture via a cell tower, within a range $R_{cell}$ of a said cell tower.

10. The AIS transponder of claim 9, wherein said dynamic historical data is transferred to said cell tower via said cellular modem when said vessel is within $R_{cell}$.

* * * * *